United States Patent

Pusch

[15] 3,679,158
[45] July 25, 1972

[54] ELASTIC BEARING FOR MOTOR SUSPENSION OF MOTOR VEHICLES

[72] Inventor: Dietrich Pusch, Resse, Germany

[73] Assignee: Continental Gummi-Werke Aktiengesellschaft, Hannover, Germany

[22] Filed: Nov. 23, 1970

[21] Appl. No.: 92,253

Related U.S. Application Data

[63] Continuation of Ser. No. 780,537, Dec. 2, 1968, abandoned.

[52] U.S. Cl. ................................. 248/10, 180/64, 267/153
[51] Int. Cl. ............................................................ F16f 15/00
[58] Field of Search ......................... 248/9, 10, 15, 18, 358; 267/153; 180/64; 296/35

[56] References Cited

UNITED STATES PATENTS

| | | |
|---|---|---|
| 1,863,370 | 6/1932 | Geyer ........................................ 248/9 |
| 2,273,869 | 2/1942 | Julien ..................................... 248/358 X |
| 2,728,593 | 12/1955 | Hutton ..................................... 248/10 X |
| 2,755,056 | 2/1956 | Hutton ..................................... 248/358 |
| 3,028,665 | 4/1962 | Hirst ........................................ 29/450 |
| 3,199,186 | 8/1965 | Simpson ................................... 29/450 |

FOREIGN PATENTS OR APPLICATIONS

| | | |
|---|---|---|
| 762,539 | 11/1956 | Great Britain ........................... 248/10 |
| 1,124,389 | 10/1956 | France ...................................... 248/9 |

*Primary Examiner*—J. Franklin Foss

[57] ABSTRACT

An elastic bearing for the motor suspension in motor vehicles having an inner sleeve and a radially spaced outer sleeve with a preloaded rubber body therebetween, in which said outer sleeve has a radially extending flange engaged by a first bead portion of said rubber body which first portion tapers away from said flange, said rubber body also having a second tapered portion adjacent said first tapered portion and tapering to a greater extent than said first tapered portion but tapering in the same direction as the latter.

2 Claims, 2 Drawing Figures

PATENTED JUL 25 1972 3,679,158
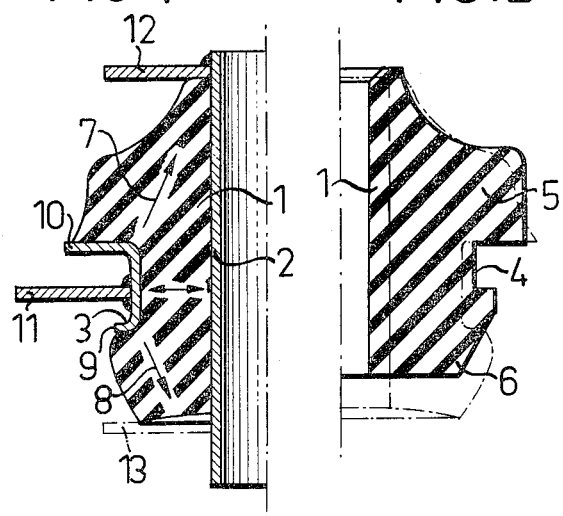
INVENTOR
DIETRICH PUSCH
BY 3,679,158

ELASTIC BEARING FOR MOTOR SUSPENSION OF MOTOR VEHICLES

This is a continuation of application, Ser. No. 780,537, filed Dec. 2, 1968 now abandoned.

The present invention relates to an elastic bearing for the motor suspension in motor vehicles, which comprises a rubber body pressed between two sleeves of metal and under an axial load, said rubber body having both end faces provided with beads of an outer diameter exceeding the outer diameter of the outer sleeve.

Axially loaded sleeve springs comprising a vulcanized rubber body between the sleeves are axially too soft and therefore are provided with additional rubber bodies acting as abutment. Furthermore, such axially loaded sleeve springs guide the motor laterally in an insufficient manner so that they are installed in most instances at an incline to the vertical plane. The rubber bodies pressed between two sleeves guide the motor laterally in a too rigid manner and therefore do not offer sufficient safety with regard to a sliding movement of the rubber body on the inner and outer sleeve.

It is, therefore, an object of the present invention to provide a motor bearing which, when subjected to oscillations of a low amplitude, will have a relatively soft shock absorbing ability and will have a high progressiveness while being sufficiently stable to prevent the rubber body from sliding on the sleeves.

This object and other objects and advantages of the invention will appear more clearly from the following specification in connection with the accompanying drawing, in which:

FIG. 1 is a section through half of the elastic bearing according to the present invention with the inner and outer sleeves in assembled condition.

FIG. 2 is a section through half of the rubber body of the bearing according to the invention in non-assembled condition.

The elastic bearing according to the present invention is characterized primarily in that the axial length of the outer sleeve equals or is less than the radial thickness of that portion of the rubber body which is located in said outer sleeve, and is furthermore characterized in that an annular groove between the beads is provided for receiving the outer sleeve, said annular groove having an axial length which is shorter than the axial length of said outer sleeve, said beads having a substantially frustoconical outer surface.

With this design of the bearing, between the outer and the inner sleeve there is provided a radially preloaded portion of material which in view of its considerable radial extension is still able axially to exert a soft shock absorbing effect, whereas the lateral guiding of the rubber body, i.e. the guiding in a direction transverse to the central axis of the sleeves, is rather precise. The beads at both ends of the outer sleeve assure a highly progressive shock absorption or spring effect in both directions. This effect is furthermore increased due to the fact that in the beads in axial direction a preload will be produced by the mounting of the outer sleeve which preload by itself is directed axially but in cooperation with the preload within the outer sleeve changes its direction at an incline with regard to the ends of the rubber bodies.

For producing the axially directed preload, the annular angled off portions on the sleeves act as a rear bearing against which the beads rest when under load and assure the proper fit of the outer sleeve so that no displacement in axial direction and consequently no sliding of the sleeve on the rubber body will occur.

The preload directed at an angle with regard to the ends of the rubber body additionally brings about a firm engagement of the rubber body with the inner sleeve which latter, due to the fact that it has a great length relative to the length of the outer sleeve, will in cooperation with the preload produced by the widening when mounting the inner sleeve firmly sit on the inner sleeve so as not to be able to slide thereon.

According to a further development of the invention, the bead absorbing the static load under pressure thrust stress is axially longer than the oppositely located bead so that the dynamic spring behavior in both axial directions together with the static load acting in one direction is approximately the same.

According to still another development of the present invention, the bead absorbing the static load tapers from the outer sleeve slightly in the first half and considerably more in the second half toward the end of the bearing. The axial preload conveyed on the outer sleeve to the rubber body will in this way be conveyed to a lesser extent to the outer surface of the slightly tapering portion so that when a considerable compression of the rubber body occurs, the rubber material bulges out in a predetermined direction toward the outside, namely at the merging area between the slightly tapering and the strongly tapering portion of the bead.

In conformity with the present invention and in further development of the bead, one end or both ends of the rubber body have a disc or discs which are connected to the inner sleeve. While both discs will assure a high progressiveness when the bearing is under axial load, that disc which is adjacent the bead absorbing the static load will initially act only slightly, i.e. within the region of the static load, but will when the bearing is under a dynamic load, produce a highly progressive characteristic.

Referring now to the drawing in detail, the rubber body 1 is pressed between the inner sleeve 2 and the outer sleeve 3. The diameter of the axial bore of the rubber body is less than the outer diameter of the inner sleeve 2 so that the said bore is widened when the rubber body is placed on said inner sleeve 2.

As will be seen from the drawing, the rubber body 1 is, with regard to the drawing, at the lower third of its length provided with an annular groove 4 which receives the outer sleeve 3. The bottom diameter of groove 4 is greater than the inner diameter of the outer sleeve 3 so that when the outer sleeve 3 is assembled, the rubber body 1 is radially compressed. The width of groove 4 in the rest position of the rubber body is narrower, which means is shorter in axial direction of the rubber body, than the width of the outer sleeve 3 so that when assembling the outer sleeve 3, the beads 5 and 6 are displaced in axial direction and a preload is imposed upon the rubber body in the resulting directions 7, 8.

FIG. 2 shows in full line the rubber body of the bearing according to the invention in non-assembled condition, whereas the dot-dash line indicates the contour which the rubber body will have after it has been pressed between the outer and inner sleeves.

The outer sleeve 3 has angled off portions 9 and 10 against which the beads 5 and 6 rest when the bearing is under an axial load in both directions. Furthermore, the said angled off portions 9 and 10 increase the preload imposed upon the rubber body as indicated by the arrows 7, 8. The bead 5 which absorbs the static load is subdivided into two sections. That section which engages the angled off portion 10 tapers only slightly, whereas the upper section (with regard to the drawing) which approximately forms the upper half of the rubber body section between the angled off portion 10 and a disc 12 at the upper end of sleeve 2, tapers to a considerable extent. The contour of this strongly tapering portion is furthermore slightly concave to bring about a sufficient cushioning effect. In view of the above outlined division into two sections, at the merging area of the two tapering sections, the area of the strongest bulge under high load in downward direction will be predetermined. The sleeve 3 is connected by means of the support 11 to the frame of a vehicle (not shown).

For purposes of increasing the progressiveness of the spring characteristic, the inner sleeve 2 has connected thereto the above mentioned disc 12 which when the bearing starts to exert its shock absorbing action, initially increasingly engages the upper bead 5 and during the last part of the shock absorbing action is pressed in the manner of an abutment against the lower portion of the bead 5. Depending on the respective conditions, the lower end of the rubber body 1 may be provided with a further disc 13 indicated by dot-dash lines which, when the bearing exerts a shock absorbing action in the opposite direction, will assure a high progressiveness of the spring characteristic.

It is, of course, to be understood that the present invention is, by no means, limited to the particular construction shown in the drawing but also comprises modifications within the scope of the appended claims.

I claim:

1. An elastic bearing for the suspension of a motor in a motor vehicle, which includes: an inner, substantially vertical, metallic sleeve, a disc fixed on the upper end of said inner sleeve, an outer metallic sleeve substantially coaxial with said inner metallic sleeve and surrounding the latter in axially spaced relationship thereto, said outer sleeve being axially considerably shorter than said inner sleeve and having a radially outwardly extending abutment at each end, a body of rubber between said inner and outer sleeves, said body having an internal diameter less than the diameter of said inner sleeve and a circumferential channel with radial end walls intermediate its ends to receive said outer sleeve with said abutments in engagement with said walls, said channel normally being of less width than the length of said outer sleeve to expand the width of said channel by said outer sleeve, said body being normally of greater thickness than the distance between said sleeves, so that said body is under compression in a radial direction between said sleeves by the expanding force of said inner sleeve and the compression force of said outer sleeve and is under stress in an axial direction between said upper radial abutment and said disc, the radial thickness of said rubber body between said outer and inner sleeves being at least as great as the axial length of said outer sleeve, said rubber body being formed with upper and lower bead means at the opposite ends of said outer sleeve, said lower bead means tapering downwardly away from said outer sleeve, said upper bead means being substantially longer axially than the axial width of said channel and substantially thicker radially than said lower bead means with the upper wall of said channel substantially wider radially than the lower wall, the lower portion of said upper bead means normally being of substantially uniform diameter before assembly under said axial stress, and the upper portion normally tapering upwardly to a substantially reduced radial thickness to be engaged and stressed by said disc for supporting the motor on said upper bead means.

2. An elastic bearing for the suspension of a motor in a motor vehicle, according to claim 1, in which said body of rubber has combined triple radial-axial preloading including one force directly radially between said inner and outer metallic sleeves, a second force inclined inwardly in one axial direction of said inner metallic sleeve, and a third force also inclined inwardly in an opposite axial direction of said inner metallic sleeve, all three of said forces being simultaneously effective resiliently to avoid axial sliding of said inner metallic sleeve relative to said body of rubber unhardened during dynamic loading thereon regardless of preloading radially and axially in opposite directions.

* * * * *